June 6, 1967   D. L. HELLER   3,324,437
REMOTE METER READING SYSTEM
Filed June 1, 1961   2 Sheets-Sheet 1

INVENTOR.
David L. Heller
BY Ralph Hammar
Attorney

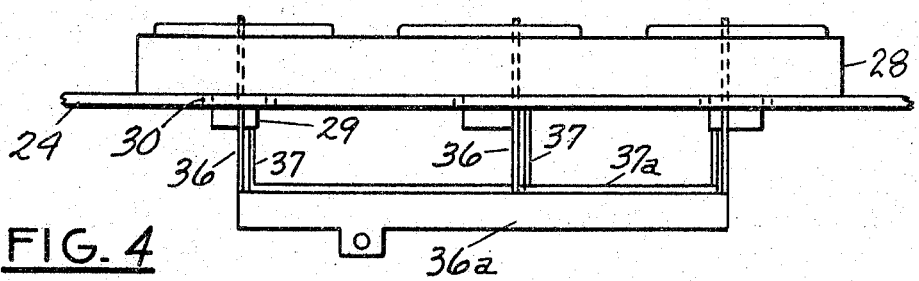
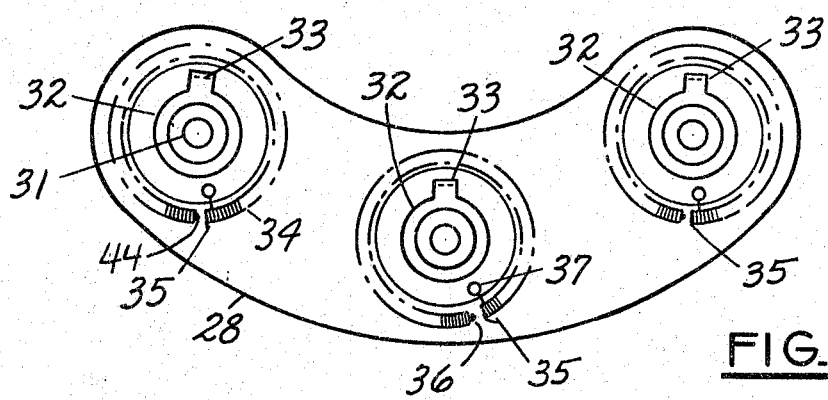
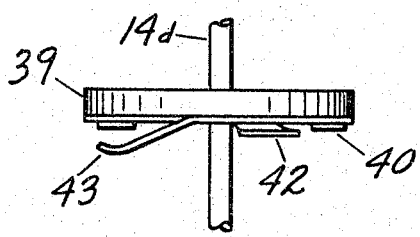
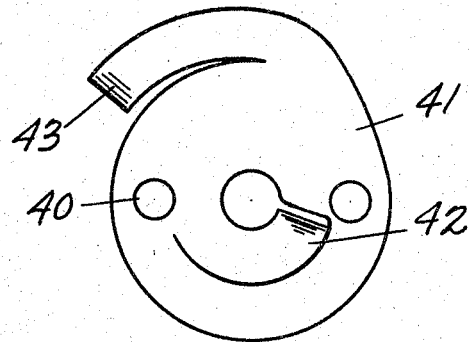
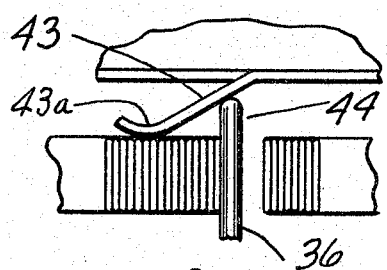

United States Patent Office 3,324,437
Patented June 6, 1967

3,324,437
REMOTE METER READING SYSTEM
David L. Heller, Levittown, Pa., assignor to American Meter Company, Incorporated, Philadelphia, Pa., a corporation of Delaware
Filed June 1, 1961, Ser. No. 114,258
15 Claims. (Cl. 338—129)

This invention is a remote meter reading system for gas and water meters and the like in which the position of the meter register shafts is assessed through wipers fixed to the shafts and cooperating with potentiometers mounted in the meter register.

In potentiometers, while going from full scale to zero, contact resistance to the wipers is in series with the potentiometer resistance and could introduce an ambiguity. This is prevented by a snap action for the wiper as it moves from full scale. The snap action is obtained by a ramp, cam, step, offset, projection, or other snap action means associated with the wiper.

Figure 1:
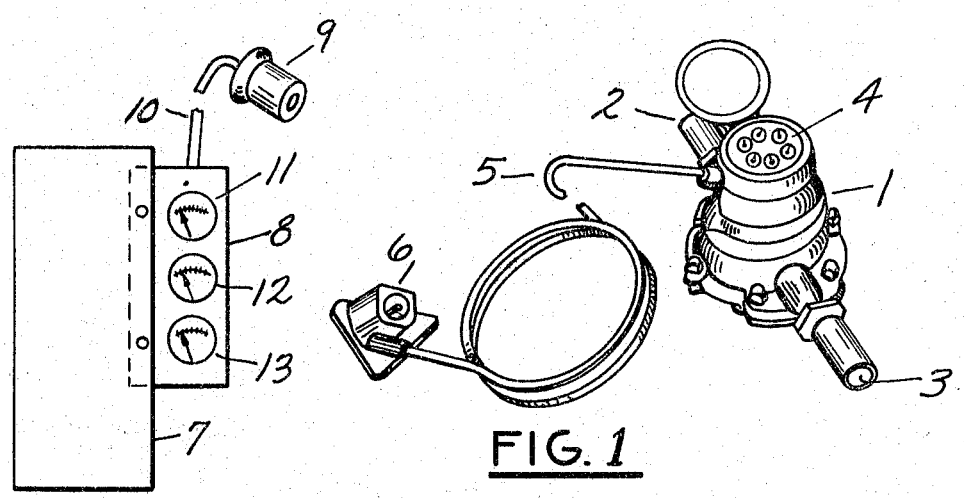
Figure 2:
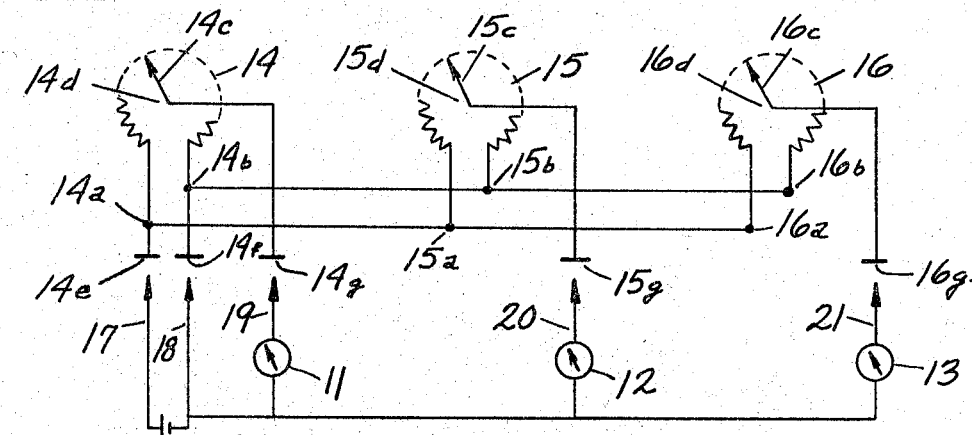
Figure 3:
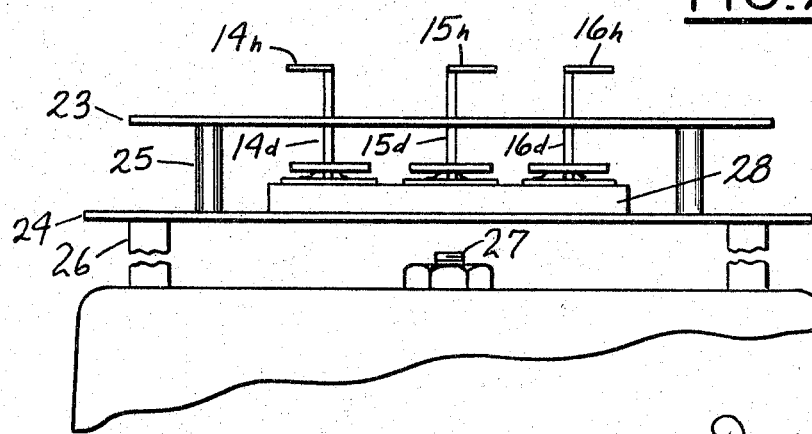

In the drawing, FIG. 1 is a perspective of the parts of the remote meter reading system, FIG. 2 is a circuit diagram, FIG. 3 is a view of a water meter register with the gearing removed, FIG. 4 is an enlarged edge view of the potentiometers, FIG. 5 is a top view of the potentiometers, FIG. 6 is an edge view of one of the potentiometer wipers, FIG. 7 is a bottom view of one of the potentiometer wipers, FIG. 8 is a view showing the construction for preventing ambiguity as the wiper passes from one end to the other of the potentiometer.

FIG. 1 shows the parts of the meter reading system. At the right are the parts to be installed in the building serviced, namely the meter 1 with its inlet and outlet fittings 2, 3 and register 4 and a length of multi-conductor cable 5 connecting the meter with a receptacle 6 to be installed in a convenient location, usually on the outside of the building serviced. At the left in FIG. 1 are shown the parts to be carried by the meter reader, namely, the usual meter reader's book 7 and the meter readout device 8, preferably mounted on one of the covers of the book and having a coupling 9 connected to the readout device by a short length of cable 10. The meter reader makes his reading by plugging the coupling 9 into the receptacle 6, thereby establishing the connection between the meter readout device 8 and the meter 1 and causing the meter reading to appear on the scales of galvanometers 11, 12, 13 corresponding to the orders of digits to be read. Meters are ordinarily read to three significant digits, which is the reason for the three galvanometers 11, 12, 13.

The arrangement for transmitting the meter register reading to the meter readout device is shown in the circuit diagram of FIG. 2. At the meter are potentiometers 14, 15, 16 having high and low ends respectively connected to conductors 14a, 14b, 15a, 15b, 16a, 16b. In each of these potentiometers is a wiper contact 14c, 15c, 16c, rotated by the associated meter register shaft 14d, 15d, 16d for respectively indicating a different order of digits of the quantity measured by the meter. In the receptacle are contacts 14e, 14f respectively associated with opposite ends of the potentiometers 14, 15 and 16. Also, there are contacts 14g, 15g, 16g, respectively associated with the wipers 14c, 15c, 16c. In the coupling 9 are contacts 17, 18, 19, 20, 21 which when the coupling is inserted in the receptacle make contact respectively with the contacts 14e, 14f, 14g, 15g, 16g. When the coupling 9 is inserted in the receptacle 6, a suitably regulated power supply indicated as battery 22 is connected across potentiometers 14, 15 and 16 through contacts 17, 18, 14e, 14f, galvanometers 11, 12, 13 are respectively connected to wipers 14c, 15c, 16c through contacts 19, 20, 21. The scales of the galvanometers 11, 12 and 13 accordingly indicate the relative position of the meter register shafts. This permits the meter reader to assess the position of the meter register shafts without visual inspection of the meter register.

The construction and arrangement of the potentiometers in the meter register is shown in FIGS. 3 to 8. As shown in FIG. 3, the meter register has upper and lower plates 23, 24 connected by posts 25. The lower plate 24 is supported on projections 26 at the upper end of the meter. The meter register shafts are driven by the meter shaft 27 through the usual reduction gearing (not shown). The usual pointers 14h, 15h, 16h are provided for visual indication of the position of the meter register shafts.

The potentiometers associated with the meter register shafts are mounted in a unitary base 28 of suitable insulating material supported on the upper side of the meter register plate 24. As shown in greater detail in FIGS. 4 and 5, the base 28, which conveniently may be of molded plastic, has on its under side three bosses 29 which extend through holes 30 in the bottom plate 24 and locate the base on the plate. The lower bearings 31 for the register shafts are molded in the base 28 and extend through the projections 29. On the upper surface of the base 28 are metal rings 32 concentric with the shaft bearings 31 and each of which has a tab 33 which projects through the base as indicated in FIG. 5. The tabs 33 are the terminals for the wipers of the potentiometers. Surrounding the rings 32 are concentric annular recesses for wire wound resistance elements 34 of generally circular shape. These elements are wound over a core 35 of insulating material and adjacent ends of the resistance wire insulating spaced or mutually insulated from each other and are respectively connected to conductors or terminals 36 and 37 which project through the base 28 and are respectively connected by conductors 36a and 37a which connect the potentiometer resistance elements in parallel across the power supply. The spacing between adjacent ends of the potentiometer resistance elements is less than the interval between digits indicated by the register shafts, usually less than half a digit.

The wipers for the potentiometer resistance elements are constructed as shown in FIGS. 6 and 7. Each comprises a disc 39 of insulating material fixed to the register shaft and having on its under side integral projections 40 which extend through and fasten a sheet metal disc 41 to the disc 39. At the center of the disc 41 is an integral finger 42 which rides on the ring 32. At the periphery of the disc 41 is an integral finger or resilient arm 43 which rides on the potentiometer resistance element. Both of the fingers 42 and 43 are easily formed in a simple stamping operation. The finger 43 has a V-shaped bend 43a serving as the wiper contact with the resistance 34.

As the wiper finger 43 goes from one end to the other of the potentiometer resistance element, there is a possibility of ambiguity due to contact resistance between the wiper and the potentiometer resistance element. This contact resistance is in series with the wiper and alters the proportion of the voltage of the power supply appearing across the galvanometers. When the wipers are between the ends of the potentiometer resistance elements, the contact resistance does not introduce any ambiguity. The relative position of the other register shafts removes any ambiguity in the same manner that displacing of the hour hand of a clock does not interfere with telling the correct time. For example, if the correct meter register position for two shafts was 37, the fact that the pointer for the digit "3" pointed to "4" would not prevent the correct reading. However, as the wiper leaves the end of the potentiometer resistance element connected to the conductors 36, contact resistance introduces serious ambiguity. At this position, the true potentiometer reading should correspond to a full scale or "10." However, the introduction of contact resistance in the wipers can cause a reading of part scale or some digit lesser than 10. While it is true that as the wipers move, this ambiguity would be corrected, it is not possible for the meter reader to wait until the movement has taken place. The meter register shafts may be turning very slowly or not at all and the wiper may remain for a long time in a position having high contact resistance with the end of the potentiometer resistance element connected to the conductor 36. This ambiguity cannot be tolerated. To avoid this ambiguity, the conductors 36 have projecting ends 44 which provide a ramp, cam surface, step portion, offset or protrusion over which the wiper finger 43 must ride. This insures that contact is maintained with the full scale end of the potentiometer resistance element until the wiper contact 43a of wiper finger 43 rides over the projection 44. When this happens, the wiper finger snaps onto the zero end of the potentiometer resistance element. This completely eliminates any ambiguity in the potentiometer reading. This kind of ambiguity does not ordinarily arise in potentiometers. It is peculiar to potentiometers where the wiper movement is very slow or intermittent.

What is claimed as new is:

1. In a meter, a register having upper and lower spaced plates, a plurality of register shafts extending between the plates for respectively indicating a different order of digits of the quantity measured by the meter, a base of insulating material between the plates and mounted on one of the plates and having holes therein serving as bearings for the register shafts, a contact ring mounted on the base concentric with each shaft, a conductor connected to said ring, a potentiometer resistance element mounted on the base concentric with each shaft and having conductors respectively at the low and high end for connection to a power supply, the spacing between the ends of the potentiometer resistance element being less than the interval between digits indicated by the associated register shaft, a wiper for each potentiometer resistance element free for more than full turn relative rotation between the wiper and the resistance element and comprising a disc of insulating material fixed to the associated register shaft and a metal plate carried thereby having two contact fingers, on riding on the ring and the other riding on the potentiometer resistance element and positioned to correspond to the digital indication of the associated register shaft whereby the voltage between the conductor connected to the ring and the conductor connected to the low end of the potentiometer resistance corresponds to the digital indication of the associated register shaft, and ramp means of conducting material electrically connected to the high end of the potentiometer resistance element and positioned between the high and low ends of the potentiometer resistance element and in the path of the other contact finger on which said other contact finger rides until it can fall off with a snap action onto the low end of the potentiometer resistance element.

2. In a meter, a base of insulating material having provisions for mounting on a meter register, said base having bearing means thereon for the meter register shafts for respectively indicating a different order of digits of the quantity measured by the meter, a contact ring mounted on the base concentric with each shaft, a conductor connected to said ring, a potentiometer resistance element mounted on the base concentric with each shaft and having conductors respectively at the low and high end for connection to a power supply, the spacing between the ends of the potentiometer resistance element being less than the interval between digits indicated by the associated register shaft, a wiper for each potentiometer resistance element free for more than full turn relative rotation between the wiper and the resistance element and comprising two contact fingers, one riding on the ring and the other riding on the potentiometer resistance element, said wiper being connected to the register shaft and positioned to correspond to the digital indication of the associated register shaft whereby the voltage between the conductor connected to the ring and the conductor connected to the low end of the potentiometer resistance element corresponds to the digital indication of the associated register shaft, and ramp means of conducting material electrically connected to the high end of the potentiometer resistance element and between the high and low ends of the potentiometer resistance element and in the path of rotation of the other contact finger on which said other contact finger rides until it can fall off with a snap action on to the end of the potentiometer.

3. In a rotary potentiometer having a resistance element of generally circular shape and a movable wiper having a surface in contact with the element and free for more than full-turn relative rotation, the ends of the resistance element being mutually insulated, the improved construction wherein the ends of the resistance element are spaced by a gap in said generally circular shape greater than the width of the contact surface of the wiper to avoid shorting of the element by the wiper and having snap action means cooperating with the wiper and operable upon progression of the wiper over one end portion of the resistance element to simultaneously transfer the contact surface of the wiper out of electrical contact with said one end portion and into electrical contact with the other end portion.

4. In a potentiometer assembly, a plurality of potentiometers each having a resistance element of generally circular shape, a wiper having a surface in contact with the element free for more than full turn relative rotation between the wiper and the resistance element, and a shaft for producing relative rotation between the element and the wiper, the resistance elements each having mutually insulated ends at a small region of the rotational path of the wiper, and reduction gears interconnecting successive shafts, at least the potentiometer having the slowest of the shafts having snap action means cooperating with the wiper and operable in response to motion of the wiper through the portion of its path containing said region to transfer the contact surface of the wiper out of electrical contact with one end portion of the resistance element and into electrical contact with the other end portion thereof.

5. In a potentiometer having a resistance element of generally circular shape having mutually insulated end terminals, a wiper having a contact engageable with the resistance element and free for more than full turn relative rotation between the wiper and the resistance element, and an operating member for producing rotation of the wiper relative to the resistance element, the improved construction having means cooperating with the wiper and responsive to passage of the wiper over one end portion of the element toward the other to snap the wiper contact out of contact with said one end portion and into contact with said other end portion, the end terminals being connected to said end portions substantially at the respective points between which wiper contact is respectively made and broken.

6. The potentiometer of claim 5 wherein the snapping means includes a cam surface and a spring, the cam surface having a step portion in the rotational region corresponding to the presence of the wiper contact in the region of the said end portion.

7. The potentiometer of claim 6 wherein the spring urges the wiper contact into contact with the element, the cam surface step portion comprising an offset between the ends of the resistance element at least partially in the direction of the urging of the spring, so that the wiper contact snaps from one end portion to the other as it passes the offset.

8. The potentiometer of claim 7 wherein the resistance element has all portions thereof other than said end portions of equal radius and in the same plane, the offset comprising a conducting protrusion on one end of the element electrically connected to said end.

9. The potentiometer of claim 8 wherein the spring comprises a resilient arm supporting the wiper contact and extending therefrom in a direction to swing the wiper contact in an arc away from the offset upon release by passage of the offset.

10. The potentiometer of claim 9 wherein the wiper contact is integral with the arm and formed by a V-shaped bend at the end thereof.

11. The potentiometer of claim 10 wherein the resistance element has a small gap between the ends and the conducting protrusion is a pin extending through the gap constituting one end of the resistance element and providing the offset.

12. In a potentiometer assembly: (a) a plurality of rotary potentiometers each having a resistance element of generally circular shape with insulatingly spaced end portions, a wiper contact in contact with the element free for more than full turn relative rotation between the wiper and the resistance element and a shaft for producing relative rotation between the element and the wiper contact, and (b) reduction gears interconnecting successive shafts, (c) at least the potentiometer with the slowest of the shafts having snap-action mechanism operable to transfer the wiper contact substantially instantaneously from one end portion to the other end portion of the resistance element through the region of the insulating spacing.

13. In a potentiometer: (a) a resistance element in the general form of a closed figure but having the ends thereof insulatingly spaced, (b) a wiper assembly having a wiper contact portion free for more than full turn relative rotation between the wiper and the resistance element and having a spring urging the wiper contact portion against the resistance element, and (c) a terminal member of conducting material at one end of the resistance element and electrically connected thereto, (d) said terminal member having a contact surface portion engaged by the wiper contact portion and spaced from the other end of the resistance element in the direction of urging of the spring, whereby the wiper contact portion is transferred by the spring between the contact surface portion of the terminal member and said other end across the insulating spacing after the wiper contact portion leaves the contact surface portion of the terminal member.

14. In a potentiometer: (a) a resistance element in the general form of a closed figure but having its end portions mutually insulated, (b) a wiper assembly free for more than full turn relative rotation between the wiper and the resistance element and having a contact portion movable relative to the resistance element, and (c) a transfer mechanism at least partially on the wiper assembly and including snap action means for transferring the contact portion between conditions of contact with the respective end portions.

15. The potentiometer of claim 14 having: (d) the resistance element in the form of a plane circle, the insulation between end portions forming a gap therein, (e) and in which the snap action means comprises the contact portion of the wiper assembly spring-biased into contact with the resistance element, and (f) a conductor in the gap electrically connected to one end portion and insulated from the other and forming a sharp-edged protuberance projecting from the contacted region of the element in opposition to the spring bias, whereby the transfer mechanism is formed in a simple and inexpensive manner.

References Cited

UNITED STATES PATENTS

| | | | |
|---|---|---|---|
| 2,280,775 | 4/1942 | Mirk | 340—188 |
| 2,729,728 | 1/1956 | Koenig | 338—164 |
| 2,774,063 | 12/1956 | Grinstead et al. | 338—129 X |
| 2,826,664 | 3/1958 | Ralston | 338—173 |
| 2,836,689 | 5/1958 | Mucher | 338—174 |
| 2,866,053 | 12/1958 | Bourns | 338—174 |
| 2,945,197 | 7/1960 | Chilton | 338—202 X |
| 3,027,551 | 3/1962 | Laurin | 340—188 |
| 3,069,670 | 12/1962 | Rondeau et al. | 340—188 |
| 3,105,216 | 9/1963 | Clayton et al. | 338—174 |

FOREIGN PATENTS

| | | |
|---|---|---|
| 842,965 | 7/1952 | Germany. |

ANTHONY BARTIS, *Primary Examiner.*

B. G. MILLER, R. M. WOOD, *Examiners.*

R. V. ROLINEC, H. T. POWELL, *Assistant Examiners.*